United States Patent [19]
Koibuchi

[11] Patent Number: 5,879,061
[45] Date of Patent: Mar. 9, 1999

[54] DEVICE FOR ESTIMATING REFERENCE WHEEL SPEED OF VEHICLE FOR TURN STABILITY CONTROL

[75] Inventor: Ken Koibuchi, Susono, Japan

[73] Assignee: Toyota Jidosha Kabushiki Kaisha, Toyota, Japan

[21] Appl. No.: 797,329

[22] Filed: Feb. 10, 1997

[30] Foreign Application Priority Data

Feb. 23, 1996 [JP] Japan ..................... 8-061912

[51] Int. Cl.⁶ ........................................... B60T 8/32
[52] U.S. Cl. ........................................ 303/146; 303/140
[58] Field of Search .................... 303/140, 146, 303/147, 148

[56] References Cited

U.S. PATENT DOCUMENTS

| 5,267,783 | 12/1993 | Inoue et al. | 303/146 |
| 5,341,296 | 8/1994 | Yasuno et al. | 303/146 |
| 5,722,743 | 3/1998 | Sano | 303/146 |

FOREIGN PATENT DOCUMENTS

| A 1-115760 | 5/1989 | Japan . |
| A 4-257756 | 9/1992 | Japan . |

Primary Examiner—Matthew C. Graham
Attorney, Agent, or Firm—Oliff & Berridge, PLC

[57] ABSTRACT

A device for estimating reference wheel speed of each wheel of a vehicle having: a calculator for calculating slip angle of vehicle body based upon lateral acceleration, yaw rate, and vehicle speed; an estimator for estimating speed of vehicle body at its center of gravity based upon wheel speed and yaw rate; and a calculator for calculating the reference wheel speed of each of the front left, front right, rear left and rear right wheels based upon the vehicle body gravity center speed, steering angle, slip angle of vehicle body, yaw rate, a half track of a corresponding wheel, and a half wheel base of a corresponding wheel as follows:

$Vmfl = Vbc * \cos(\delta f - \beta) - \gamma * T * \cos \delta f + \gamma * \sin \delta f * Lf;$ $Vmfr = Vbc * \cos(\delta f - \beta) + \gamma * Tfl * \cos \delta f + \gamma * \sin \delta f * Lf;$ $Vmrl = Vbc * \cos \beta + \gamma * Trl$ $Vmrr = Vbc * \cos \beta - \gamma * Trr;$ wherein Vmfl, Vmfr, Vmrl and Vmrr are the reference wheel speed of front left, front right, rear left and rear right wheels, respectively, Vb is the vehicle body gravity center speed, δf is the steering angle, β is the vehicle body slip angle, γ is the yaw rate, Tfl is a half track of the front left wheel, Tfr is a half track of the front right wheel, Trl is the half tred of the rear left wheel, Trr is the half track of the rear right wheel, Lf is the half wheel base of the front left and front right wheels. The half track of each wheel may desirably be modified against lateral biasing of the wheel tire due to centrifugal force of acting during turn of the vehicle.

12 Claims, 5 Drawing Sheets

DEVICE FOR ESTIMATING REFERENCE WHEEL SPEED OF VEHICLE FOR TURN STABILITY CONTROL

BACKGROUND OF THE INVENTION

1. Field of the Invention

The present invention relates to the art of turn stability control of a vehicle such as an automobile, and more particularly, to a device for estimating standard wheel speed of each of the four wheels of a four-wheeled vehicle for use in the turn stability controls thereof carried out in various manners to suppress spin and drift-out during turn running.

2. Description of the Prior Art

There have been proposed various devices for controlling the turn stability of a vehicle such that the vehicle is watched with respect to the slip angle of the vehicle body against spinning, or with respect to the slip angle of the rear wheel or the side slip of the vehicle body against drifting out, and when the watching parameter against the spinning increases beyond a threshold value determined therefor, the brake system is automatically actuated to brake the front wheel at the outside of the turn, or if the vehicle is a front drive vehicle, the traction of the front driving wheels is instantly increased, or when the watching parameter against the drifting out increases beyond a threshold value determined therefor, the brake system is automatically actuated to brake certain wheels, particularly the rear wheel at the inside of the turn, or when the vehicle is a front drive vehicle, the traction of the front driving wheels is temporarily decreased, with various modifications of actuation of the brake system or the engine output control system in relation to various other operation parameters. Various patent applications have been filed by the same assignee as the present application based upon the inventions made by the colleague of the present inventor, such as U.S. Pat. Nos. 5,704,695; 5,707,119; 5,704,696; 5,727,853; 5,707,120; and 5,709,439; as well as co-pending U.S. patent applications Nos. 08/723,757, and 08/726,412 (allowed Feb. 10, 1998). Further, U.S. patent application Ser. No. 08/798,465 is also co-pending as filed by the same assignee on an invention by the present inventor. The contents of those co-pending applications are hereby incorporated into the present application for reference of such art.

When a wheel or a plurality of wheels are braked or driven for the purpose of stability control, the braking or traction control is generally executed such that the slip ratio of each of the wheels is brought to the target value calculated therefor according to certain stability control calculation schedules. In the above-mentioned co-pending applications, when the target slip ratio has been calculated with respect to each of the four wheels according to the respective particular control calculation schedules, the target wheel speed Vwti (i=fl, fr, rl, rr) of each of the four wheels, i.e. front left, front right, rear left and rear right wheels, is calculated based upon the corresponding target slip ratio SLi and a reference wheel speed Vb as Vwti=Vb*(100−SLi), wherein the reference wheel speed is presumed to be common for all of the four wheels, and is generally made to be that of the front wheel at the inside of the turn, assuming that the vehicle is an automobile of the rear drive type to which the turn stability control of the present art will be mostly applied.

However, since the braking or driving for the purpose of stability control is generally light and delicate, even a slight difference in the estimation of the target wheel speed substantially affects the quality of the turn stability control, particularly when the effect of braking is exhibited as a difference between the braking of two or more wheels simultaneously braked. Therefore, it is contemplated that the reference wheel speed for the calculation of the target wheel speed should be estimated to be more reflective of particular turning conditions of each wheel for further improvement of the quality of the stability control.

Further, since the stability control depends mostly on the balance of the braking effects at respective wheels, it is contemplated that a relatively small change of a half track of each wheel, i.e. the distance of each wheel from the longitudinal center of the vehicle body (more precisely, longitudinal vertical center plane (phantom) of the vehicle body), due to a biasing deformation of the wheel tire under the action of the centrifugal force of the vehicle body during a turn running thereof, will have to be incorporated into the estimation of the reference wheel speed for further improvement of the stability control.

SUMMARY OF THE INVENTION

Therefore, it is a primary object of the present invention to provide a device for estimating the reference wheel speed for calculating the target slip ratio of each of the four wheels of a four wheeled vehicle for use in turn stability control systems such that the reference wheel speed is estimated with respect to each of the four wheels to be more reflective of turning conditions of each wheel for further improvement of the quality of turn stability control systems.

According to the present invention, the above-mentioned primary object is accomplished by a device for estimating reference wheel speed of each wheel of a vehicle having a vehicle body, front left, front right, rear left and rear right wheels supporting the vehicle body, and means for detecting operation parameters thereof, such as wheel speed of each of the front left, front right, rear left and rear right wheels, lateral acceleration, steering angle, and yaw rate, the reference wheel speed estimation device comprising:

a means for calculating slip angle of the vehicle body based upon the lateral acceleration, the yaw rate detected by said vehicle operation parameter detection means, and vehicle speed;

a means for estimating speed of the vehicle body at a center of gravity thereof based upon wheel speed detected by said vehicle operation parameter detection means, and the yaw rate; and a means for calculating the reference wheel speed of each of the front left, front right, rear left and rear right wheels based upon the vehicle body gravity center speed estimation by said vehicle body gravity center speed estimation means, the steering angle detected by said vehicle operation parameter detection means, the slip angle of the vehicle body calculated by said vehicle body slip angle calculation means, the yaw rate detected by said vehicle operation parameter detection means, a half track of the corresponding wheel, and a half wheel base of the corresponding wheel as follows:

$Vmfl = Vbc*\cos(\delta f - \beta) - \gamma*Tfl*\cos\delta f + \gamma*\sin\delta f*Lf$ $Vmfr = Vbc*\cos(\delta f - \beta) + \gamma*Tfl*\cos\delta f + \gamma*\sin\delta f*Lf$ $Vmrl = Vbc*\cos\beta + \gamma*Trl$ $Vmrr = Vbc*\cos\beta - \gamma*Trr$ wherein Vmfl, Vmfr, Vmrl and Vmrr are the reference wheel speeds of the front left, front right, rear left and rear right wheels, respectively, Vbc is the vehicle body gravity center speed, δf is the steering angle, β is the vehicle body slip angle, γ is the yaw rate, Tfl is a half track of the front left wheel, Tfr is a half track of the front right wheel, Trl is a half track of the rear left wheel, Trr is a half track of the rear right wheel, and Lf is a half wheel base of the front left and front right wheels.

By the reference wheel speed for calculating the target slip ratio of each of the front left, front right, rear left and rear right wheels being estimated separately with respect to each of the front left, front right, rear left and rear right wheels based upon a common vehicle body gravity center speed in reference to the slip angle and the yaw rate of the vehicle body, the target vehicle wheel speed is more properly estimated to reflect the particular turning condition of each wheel on the estimated value thereof, so that the stability control against the spinning or drifting out of the vehicle is more finely and delicately executed.

When the vehicle is a rear drive vehicle, said vehicle body gravity center speed estimation means may estimate the vehicle body gravity center speed such that when the front left and front right wheels are not braked, the vehicle body gravity center speed is a weighted mean of a first value and a second value by a weighting factor, said first value being a vehicle body gravity center speed calculated based upon the wheel speed of the front left wheel detected by said vehicle operation parameter detection means, the yaw rate, and the half track of the front left wheel, said second value being a vehicle body gravity center speed calculated based upon the wheel speed of the front right wheel detected by said vehicle operation parameter detection means, the yaw rate, and the half track of the front right wheel, said weighting factor being 0.5 when the lateral acceleration is zero, substantially proportionally increasing therefrom along with increase of the lateral acceleration toward saturation, i.e. toward 1.0.

When the vehicle is a rear drive vehicle, said vehicle body gravity center speed estimation means may estimate the vehicle body gravity center speed such that, when the front left wheel is braked, while the front right wheel is not braked, the vehicle body gravity center speed is estimated based upon the wheel speed of the front right wheel detected by said vehicle operation parameter detection means, the yaw rate, and the half track of the front right wheel, and when the front right wheel is braked, while the front left wheel is not braked, the vehicle body gravity center speed is estimated based upon the wheel speed of the front left wheel detected by said vehicle operation parameter detection means, the yaw rate, and the half track of the front left wheel.

When the vehicle is a front drive vehicle, said vehicle body gravity center speed estimation means may estimate the vehicle body gravity center speed such that when the rear left and rear right wheels are not braked, the vehicle body gravity center speed is a weighted mean of a first value and a second value by a weighted factor, said first value being a vehicle body gravity center speed calculated based upon the wheel speed of the rear left wheel detected by said vehicle operation parameter detection means, the yaw rate, and the half track of the rear left wheel, said second value being vehicle body gravity center speed calculated based upon the wheel speed of the rear right wheel detected by said vehicle operation parameter detection means, the yaw rate, and the half track of the rear right wheel, said weighting factor being 0.5 when the lateral acceleration is zero, substantially proportionally increasing therefrom along with increase of the lateral acceleration toward saturation, i.e. toward 1.0.

When the vehicle is a front drive vehicle, said vehicle body gravity center speed estimation means may estimate the vehicle body gravity center speed such that, when the rear left wheel is braked, while the rear right wheel is not braked, the vehicle body gravity center speed is estimated based upon the wheel speed of the rear right wheel detected by said vehicle operation parameter detection means, the yaw rate, and the half track of the rear right wheel, and when the rear right wheel is braked, while the rear left wheel is not braked, the vehicle body gravity center speed is estimated based upon the wheel speed of the rear left wheel detected by said vehicle operation parameter detection means, the yaw rate, and the half track of the rear left wheel.

When the vehicle is a rear drive vehicle having an anti-lock brake system, said vehicle body gravity center speed estimation means may estimate the vehicle body gravity center speed such that, when at least the front left or front right wheel is not braked by said anti-lock brake system, the vehicle body gravity center speed is estimate based upon the wheel speed of said not braked front left or front right wheel detected by said vehicle operation parameter detection means, the yaw rate, and the half track of said not braked front left or front right wheel.

When the vehicle is a front drive vehicle having an anti-lock brake system, said vehicle body gravity center speed estimation means may estimate the vehicle body gravity center speed such that, when at least the rear left or rear right wheel is not braked by said anti-lock brake system, the vehicle body gravity center speed is estimated based upon the wheel speed of said not braked rear left or rear right wheel detected by said vehicle operation parameter detection means, the yaw rate, and the half track of said not braked rear left or rear right wheel.

When the vehicle is a rear drive vehicle having an anti-lock brake system, said vehicle body gravity center speed estimation means may estimate the vehicle body gravity center speed such that, when the front left and front right wheels are braked by said anti-lock brake system, the vehicle body gravity center speed is estimated based upon a smaller one of the wheel speed of the front left and front right wheels detected by said vehicle operation parameter detection means, the yaw rate, and the half track of the smaller speed front left or front right wheel.

When the vehicle is a front drive vehicle having an anti-lock brake system, said vehicle body gravity center speed estimation means may estimate the vehicle body gravity center speed such that, when the rear left and rear right wheels are braked by said anti-lock brake system, the vehicle body gravity center speed is estimated based upon a smaller one of the wheel speed of the rear left and rear right wheels detected by said vehicle operation parameter detection means, the yaw rate, and the half track of the smaller speed rear left or rear right wheel.

When the vehicle is a rear drive vehicle having a traction control system, said vehicle body gravity center speed estimation means may estimate the vehicle body gravity center speed such that the vehicle body gravity center speed is presumed based upon the wheel speed of the front left or front right wheel detected by said vehicle operation parameter detection means, the yaw rate, and the half track of the corresponding front left or front right wheel.

When the vehicle is a front drive vehicle having a traction control system, said vehicle body gravity center speed estimation means may estimate the vehicle body gravity center speed such that the vehicle body gravity center speed is estimated based upon the wheel speed of the rear left or rear right wheel detected by said vehicle operation parameter detection means, the yaw rate, and the half track of the corresponding rear left or rear right wheel.

Further, the above-mentioned reference wheel speed estimation device may be constructed such that, said vehicle operation parameter detection means is adapted to further detect longitudinal acceleration of the vehicle, and the reference wheel speed estimation device further comprises:
- a means for calculating longitudinal shifting of the vehicle body relative to the front left, front right, rear left and rear right wheels based upon the longitudinal acceleration;
- a means for calculating lateral shifting of the vehicle body relative to the front left, front right, rear left and rear right wheels based upon the lateral acceleration;
- a means for calculating ground contact load of each of the front left, front right, rear left and rear right wheels based upon the longitudinal and lateral shifting of the vehicle body;
- a means for calculating total cornering force of the front left and front right wheels based upon vehicle speed detected by said vehicle operation parameter detection means, change rate of the vehicle body slip angle, and change rate of the yaw rate;
- a means for calculating total cornering force of the rear left and rear right wheels based upon vehicle speed detected by said vehicle operation parameter detection means, change rate of the vehicle body slip angle, and change rate of the yaw rate;
- a means for calculating distribution of the front total cornering force between the front left and front right wheels based upon the ground contact load of the front left and front right wheels;
- a means for calculating distribution of the rear total cornering force between the rear left and rear right wheels based upon the ground contact load of the rear left and front right wheels; and
- a means for estimating lateral biasing of tire of each of the front left, front right, rear left and rear right wheels based upon the cornering force of the corresponding wheel, and compensating for the half track of each of the front left, front right, rear left and rear right wheels by the lateral tire biasing estimated with respect to the corresponding wheel.

By such an arrangement, the estimation of the reference wheel speed of each of the front right, front left, rear left and rear right wheels is more precisely adapted to each particular turning condition of each wheel with each appropriate adjustment in reference to a biasing deformation of the tire of each wheel due to a side swinging of the vehicle during turn running thereof.

BRIEF DESCRIPTION OF THE DRAWINGS

In the accompanying drawings

DESCRIPTION OF THE EMBODIMENTS

Figure 1:
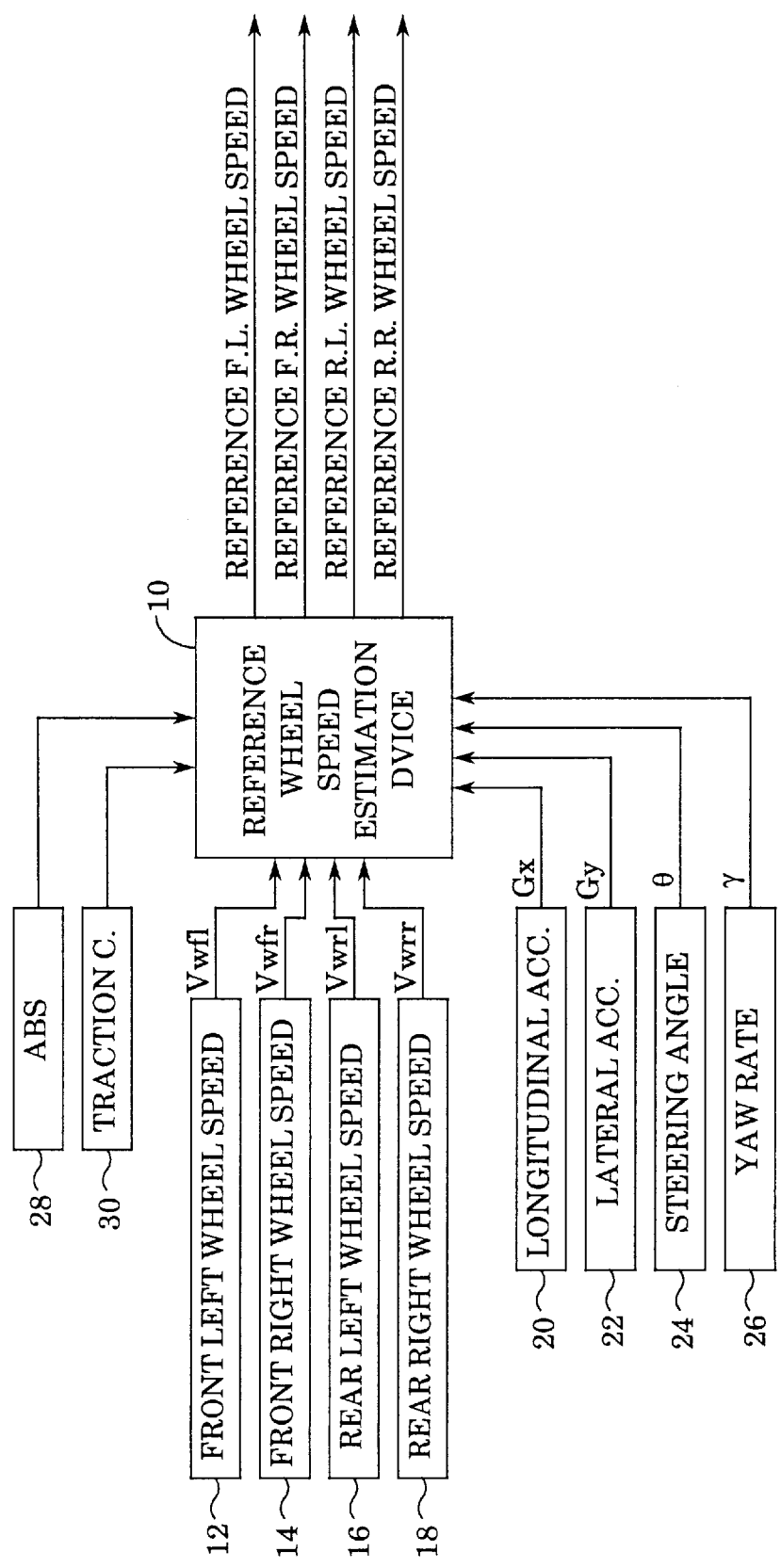
FIG. 1 is a diagrammatic illustration of the reference wheel speed estimation device according to the present invention, shown in relation with some operation parameter detection means and some special control means of a vehicle.

In the following, the present invention will be described in more detail with respect to some embodiments thereof with reference to the accompanying drawing.

The reference wheel speed estimation device according to the present invention is incorporated in a turn stability control device of a vehicle as a part thereof. Such a turn stability control device comprises a hydraulic circuit means adapted to separately controllably apply a braking action to each of the front left, front right, rear left and rear right wheels of the vehicle according to control signals supplied thereto and an electric control means adapted to make various control calculations according to control programs installed therein to generate the control signals supplied to the hydraulic circuit means. Such a general construction of the turn stability control device is illustrated and described in detail in the aforementioned related patents and co-pending patent applications. The fundamental control operation of such a turn stability control device is carried out such that a parameter named "spin value" or "spin quantity" representative of a spinning state of the vehicle and/or a parameter named "drift-out value" or "drift-out quantity" representative of a drifting out state of the vehicle is estimated based upon the steering angle, yaw rate, lateral acceleration and longitudinal speed of the vehicle, etc. Then, by watching the spin and/or drift-out representative parameter, it is calculated how one or a plurality of wheels are to be braked or accelerated to suppress the vehicle from spinning or drifting out. The calculated braking or accelerating force is then converted into a corresponding slip ratio to be effected at a corresponding wheel to generate such a force, and then the slip ratio is converted into a target wheel speed of the corresponding wheel to be attained by the braking or acceleration as follows:

$$Vwti = Vb^*(100-SLi)/100$$

wherein Vwti (i=fl, fr, rl, rr) is the target wheel speed of front left, front right, rear left or rear right wheel, Vb is a reference wheel speed which is made to be that of a front wheel serving at the inside of the turn, and SLi (i=fl, fr, rl, rr) is the slip ratio calculated with respect to the front left, front right, rear left or rear right wheel. Since such a fundamental turn stability control process carried out by such a turn stability control device is not the subject of the present invention, such a background of the present invention is not described herein in detail, but will be incorporated in this description by reference to the aforementioned co-pending patent applications, if required. The subject of the present invention is to provide a device for estimating the above-mentioned reference wheel speed differently from the above-mentioned Vb of the front wheel serving at the inside of the turn.

Therefore, the reference wheel speed estimation device 10 according to the present invention requires information with regard to several operation parameters such as wheel speed Vwi (i=fl, fr, rl, rr) of front left, front right, rear left and rear right wheels as supplied from corresponding wheel speed sensors 12–18, longitudinal acceleration Gx of the vehicle as supplied from a corresponding sensor 20, lateral acceleration Gy of the vehicle as supplied from a corresponding sensor 22, steering angle θ as supplied from a corresponding sensor 24, and yaw rate γ as supplied from a corresponding sensor 26. Further, when the reference wheel speed estimation device according to the present invention is to operate also in reference to the operation of an anti-lock brake system (ABS) and/or a traction control system, information with regard to the operation of those means is also input thereto. Based upon those data, the reference wheel estimation device 10 outputs reference wheel speed signals of each of the front left, front right, rear left and rear right wheels.

An embodiment of the reference wheel speed estimation device according to the present invention will be described in the form of its operation with reference to FIGS. 2–6.

Figure 2:
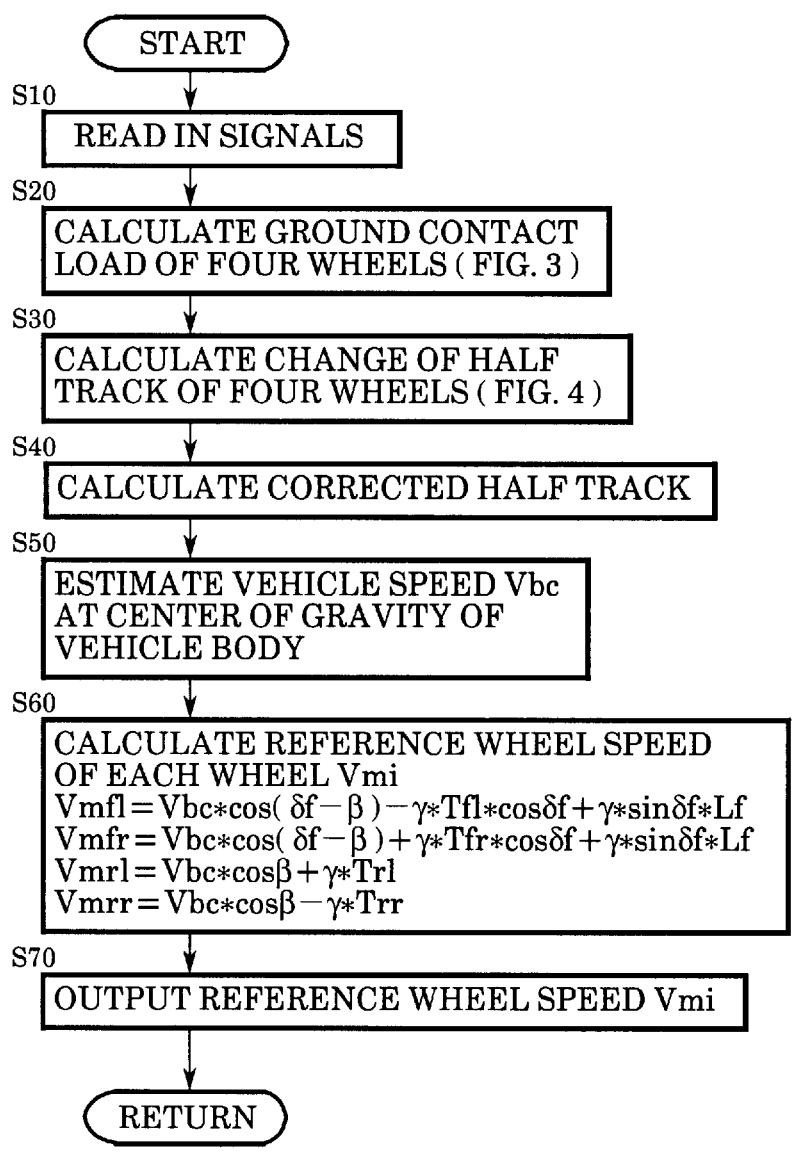
FIG. 2 is a flowchart showing a full model of the control operation carried out by the reference wheel speed estimation device according to the present invention, wherein some steps may be omitted.

When the reference wheel speed estimation device is started together with the turn stability control device in which it is incorporated by a closure of an ignition switch of the vehicle, not shown in the figure, the processes illustrated by the flowchart of FIG. 2 are carried out repetitively at a predetermined cycle time interval, such as tens of microseconds.

In step 10, the signals are read in from the sensors shown in FIG. 1.

Figure 3:
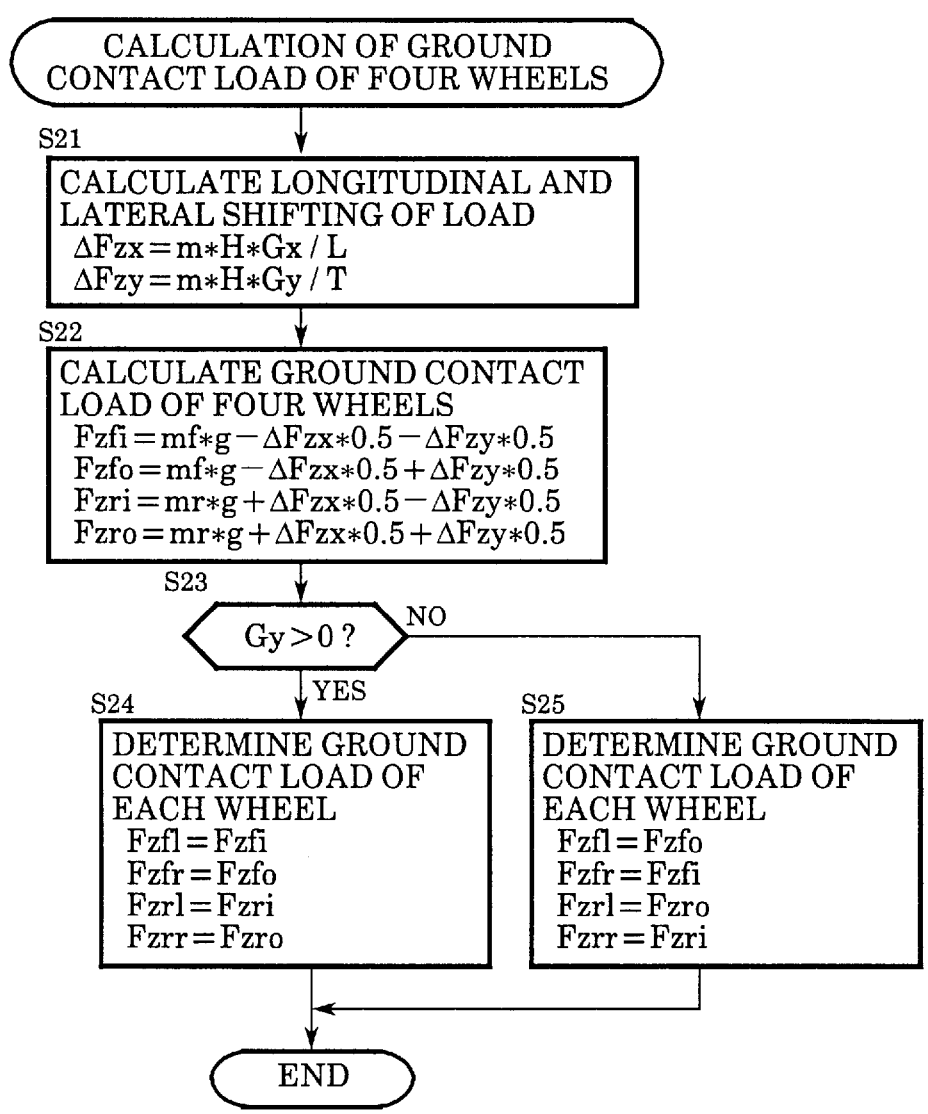
FIG. 3 is a flowchart showing the operation of step 20 of FIG. 2 in more detail.

In step 20, the ground contact load of each of the four wheels is calculated as shown by the flowchart of FIG. 3, which will be described later with reference to FIG. 3.

Figure 4:
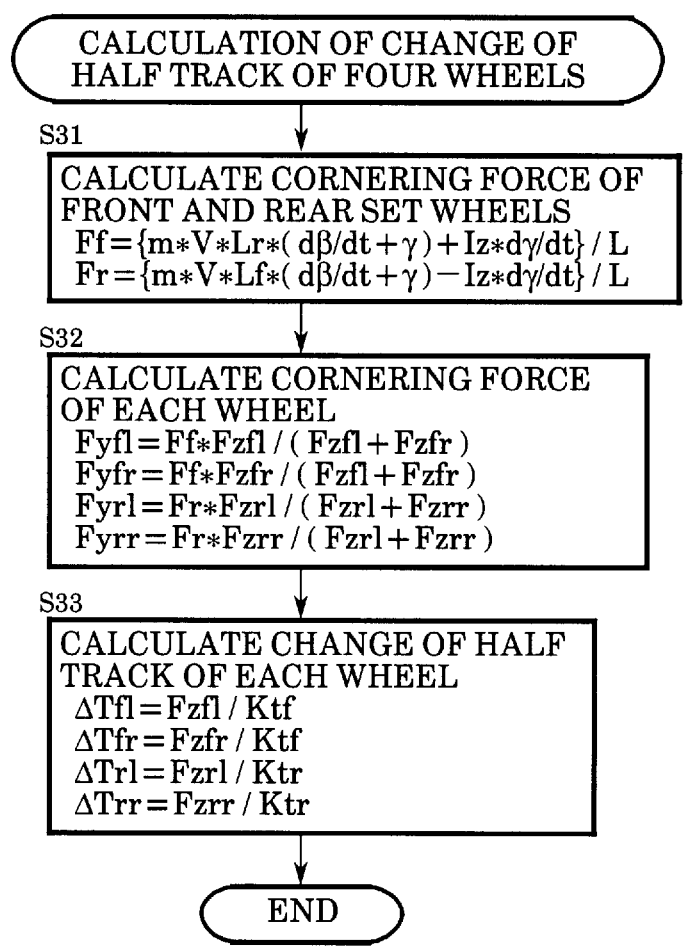
FIG. 4 is a flowchart showing the operation of step 30 of FIG. 2 in more detail.

In step 30, a change of a half track, i.e. the distance between each wheel and the longitudinal center line of the vehicle body (more precisely a phantom vertical plane including a longitudinal axis of the vehicle body), is calculated with respect to each of the four wheels as shown by the flowchart of FIG. 4, which will be described later with reference to FIG. 4.

In step 40, based upon the change of the half track calculated in step 30, the value of the half track of each of the four wheels is corrected such that the value of the half track of each of the four wheels incorporates the influence of a biasing of each tire due to a side swinging of the vehicle during a turn running of the vehicle.

In step 50, speed Vbc at the center of gravity of the vehicle body is estimated in various ways as described in detail hereinbelow according to various operating conditions of the vehicle. This vehicle body gravity center speed Vbc is a scalar value. Further, as will be noted from the estimation calculations made in the next step, "wheel speed" in the present description refers to a product of rotation speed of wheel (rotation per second) and the circular constant ($\pi$).

In step 60, based upon the vehicle body gravity center speed Vbc estimated above, the wheel speed of each of the four wheels is calculated as follows:

$$Vmfl = Vbc^* \cos(\delta f - \beta) - \gamma^* Tfl^* \cos \delta f + \gamma^* \sin \delta f^* Lf$$

$$Vmfr = Vbc^* \cos(\delta f - \beta) + \gamma^* Tfl^* \cos \delta f + \gamma^* \sin \delta f^* Lf$$

$$Vmrl = Vbc^* \cos \beta + \gamma^* Trl$$

$$Vmrr = Vbc^* \cos \beta - \gamma^* Trr$$

wherein Vmfl, Vmfr, Vmrl and Vmrr are the reference wheel speed of the front left, front right, rear left and rear right wheels, respectively, Vbc is the vehicle body gravity center speed, $\delta f$ is the steering angle (may be a mean value of those of front left and front right wheels calculated based upon the steering angle $\theta$ detected by the sensor 24, $\beta$ is slip angle of the vehicle body (available as a ratio of difference between the lateral acceleration Gy detected by the sensor 22 and a product of yaw rate $\gamma$ detected by the sensor 26 and vehicle speed V conveniently represented by an optional one of four wheel speeds detected by sensors 12–18 to vehicle speed V, such as $\beta=(Gy-V^*\gamma)/V$), Tfl is the half track of the front left wheel, Tfr is the half track of the front right wheel, Trl is the half track of the rear left wheel, Trr is the half track of the rear right wheel, Lf is a half wheel base of the front left and front right wheels, i.e. the distance of the front axle from the center of gravity of the vehicle body (more precisely, a phantom vertical plane passing the center of gravity of the vehicle body and transverse to the longitudinal axis of the vehicle body).

In step 70, the reference wheel speed Vmfl–Vmrr thus estimated is output.

The calculation of the ground contact load of the four wheels in step 20 of FIG. 2 is carried out as shown in the flowchart of FIG. 3.

In step 21, longitudinal and lateral shifting of load between the front and rear wheels are calculated based upon the longitudinal acceleration Gx and the lateral acceleration Gy detected by the sensors 20 and 22 of FIG. 1 as follows:

$$\Delta Fzx = m^* H^* Gx/L$$

$$\Delta Fzy = m^* H^* Gy/T$$

wherein $\Delta Fzx$ is the shifting of load from the front wheels to the rear wheels, $\Delta Fzy$ is the shifting of load from wheels at the inside of the turn to the wheels at the outside of the turn, m is the mass of the vehicle body, H is the height of the center of gravity of the vehicle body from the ground surface, L is the wheel base and T is the track.

In step 22, ground contact load of each of the four wheels are calculated as follows:

$$Fzfi = mf^*g - \Delta Fzx^*0.5 - \Delta Fzy^*0.5$$

$$Fzfo = mf^*g - \Delta Fzx^*0.5 + \Delta Fzy^*0^*5$$

$$Fzri = mr^*g + \Delta Fzx^*0.5 - \Delta Fzy^*0.5$$

$$Fzro = mr^*g + \Delta Fzx^*0.5 + \Delta Fzy^*0.5$$

wherein Fzfi and Fzri are the ground contact load of the front and rear wheels serving at the inside of the turn, Fzfo and Fzro are the ground contact load of the front and rear wheels serving at the outside of the turn, mf and mr are the shares of the mass of the vehicle body on the front and rear wheels, respectively, and g is the acceleration of gravity.

In step 23, the direction of the turn is judged by the sign of Gy. According to the general practice in this art, the turn is judged as a left turn when Gy is positive. According to the answer of step 23, in step 24 or 25, Fzfi, Fzfo, Fzri and Fzro are appropriately allocated to the ground contact load of front left, front right, rear left and rear right wheels, i.e. Fzfl, Fzfr, Fzrl and Fzrr.

The calculation of the change of the half track in step 30 of FIG. 2 is carried out as shown in the flowchart of FIG. 4.

In step 31, the cornering force of the front and rear wheels is calculated as follows:

$$Ff = \{m^*V^*Lr^*(d\beta/dt+\gamma)+Iz^*d\gamma/dt\}/L$$

$$Fr = \{m^*V^*Lf^*(d\beta/dt+\gamma)-Iz^*d\gamma/dt\}/L$$

wherein Ff and Fr are the cornering force of the front and rear wheels, respectively, m is the mass of the vehicle body, V is vehicle speed conveniently represented by an optional one of the four wheel speeds detected by the sensors 12–18, Lf and Lr are the half wheel base of the front and rear wheels, respectively, $\beta$ is the slip angle of the vehicle body, Iz is the inertia moment of the vehicle body around the center of gravity thereof, $\gamma$ is the yaw rate, and L is the wheel base. The half wheel base Lr of the rear left and rear right wheels is defined in a manner similar to the half wheel base Lf of the front wheel.

In step 32, the cornering force of the front and rear wheels are shared into the four wheels according to the balance of the ground contact load of the respective wheels as follows:

$$Fyfl=Ff*Fzfl/(Fzfl+Fzfr)$$

$$Fyfr=Ff*Fzfr/(Fzfl+Fzfr)$$

$$Fyrl=Fr*Fzrl/(Fzrl+Fzrr)$$

$$Fyrr=Fr*Fzrr/(Fzrl+Fzrr)$$

wherein Fyfl, Fyfr, Fyrl and Fyrr are the cornering force of the front left, front right, rear left and rear right wheels, respectively.

In step 33, based upon the cornering force of each of the four wheels, the change of the half track of each wheel is estimated with the lateral elasticity of the corresponding tire as follows:

$$\Delta Tfl=Fzfl/Ktf$$

$$\Delta Tfr=Fzfr/Ktf$$

$$\Delta Trl=Fzrl/Ktr$$

$$\Delta Trr=Fzrr/Ktr$$

wherein $\Delta Tfl$, $\Delta Tfr$, $\Delta Trl$ and $\Delta Trr$ are the change of the half track of the front left, front right, rear left and rear right wheel, respectively, and Ktf and Ktr are the lateral elasticity of the front and rear tires, respectively.

In step 40 of FIG. 20, the half track of the front left, front right, rear left and rear right wheel as designed are modified by $\Delta Tfl$, $\Delta Tfr$, $\Delta Trl$ and $\Delta Trr$ to provide Tfl, Tfr, Trl and Trr to be used in step 60 of FIG. 2.

Now, the estimation of the speed Vbc of the vehicle body at the center of gravity made in step 50 is described.

When the vehicle is a rear drive vehicle, and if the front left and rear right wheels are not braked, the vehicle body gravity center speed is estimated as follows:

The vehicle body gravity center speed is separately calculated based upon the wheel speed Vwfl of the front left wheel detected by the sensor 12 or the wheel speed Vwfr of the front right wheel detected by the sensor 14, the yaw rate γ, and the half track Tfl or Tfr of the front left or front right wheel as follows:

$$Vbc,fl=Vwfl-\gamma*Tfl$$

$$Vbc,fr=Vwfr-\gamma*Tfr$$

Figure 5:
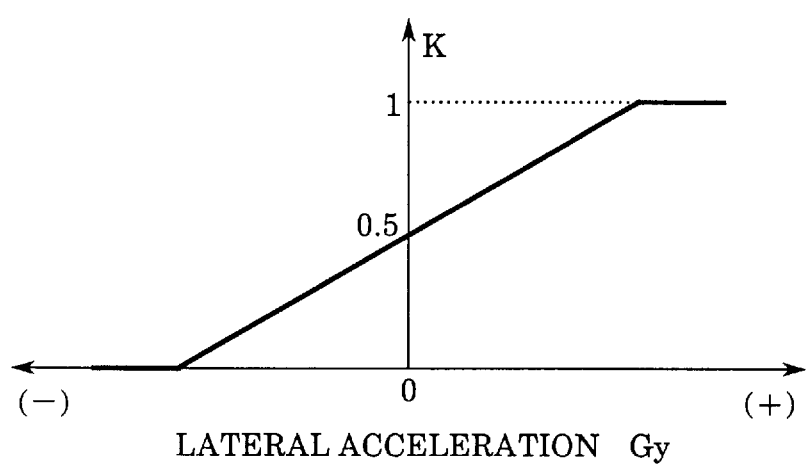
FIG. 5 is a map for a weighing factor in estimating the speed of the vehicle body at the center of gravity thereof under a certain operating condition described hereinunder.

Then, by looking at a map, such as shown in FIG. 5, with the value of lateral acceleration Gy for a weighting factor K, the vehicle body gravity center speed Vbc is estimated as a weighting mean of Vbc,fl and Vbc,fr as follows:

$$Vbc=\{Vbc,fr*K+Vbc,fl*(1-K)\}/K$$

As shown in FIG. 5, the weighing factor K is 0.5 when the lateral acceleration Gy is zero, and substantially proportionally increases from 0.5 along with increase with the lateral acceleration until it saturates at 1.

When the vehicle is a rear drive vehicle, and if the front left wheel is braked, while the front right wheel is not braked, the vehicle body gravity center speed is presumed to be Vbc,fr. When the vehicle is a rear drive vehicle, and if the front left wheel is not braked, while the front right wheel is braked, the vehicle body gravity center speed is presumed to be Vbc,fl.

The present invention is applicable to front drive vehicles as well as rear drive vehicles.

When the vehicle is a front drive vehicle, and if the rear left and rear right wheels are not braked, the vehicle body gravity center speed is presumed as follows:

The vehicle body gravity center speed is separately calculated based upon the wheel speed Vwrl of the rear left wheel detected by the sensor 16 or the wheel speed Vwrr of the rear right wheel detected by the sensor 18, the yaw rate γ, and the half tred Trl or Trr of the rear left or rear right wheel as follows:

$$Vbc,rl=Vwrl-\gamma*Trl$$

$$Vbc,rr=Vwrr-\gamma*Trr$$

Then, by looking at a map such as shown in FIG. 5 (may be the same as that for the front wheels or similar to but different from that for the front wheels) with the value of lateral acceleration Gy for a weighing factor K, the vehicle body gravity center speed Vbc is estimated as a weighted mean of Vbc,rl and Vbc,rr as follows:

$$Vbc=\{Vbc,rr*K+Vbc,rl*(1-K)\}/K$$

When the vehicle is a front drive vehicle, and if the rear left wheel is braked, while the rear right wheel is not braked, the vehicle body gravity center speed is estimated to be Vbc,rr. When the vehicle is a front drive vehicle, and if the rear left wheel is not braked, while the rear right wheel is braked, the vehicle body gravity center speed is presumed to be Vbc,rl.

When the vehicle is a rear drive vehicle having an anti-lock brake system, and if at least the front left or front right wheel is not braked by the anti-lock brake system, the vehicle body gravity center speed is estimated based upon the wheel speed of the not braked front left or front right wheel detected by the sensor 12 or 14, the yaw rate γ, and the half track Tfl or Tfr of the not braked front left or front right wheel.

When the vehicle is a front drive vehicle having an anti-lock brake system, and if at least the rear left or rear right wheel is not braked by the anti-lock brake system, the vehicle body gravity center speed is estimated based upon the wheel speed of the not braked rear left or rear right wheel detected by the sensor 16 or 18, the yaw rate, and the half track Trl or Trr of the not braked rear left or rear right wheel according to the same equation as described above.

When the vehicle is a rear drive vehicle having an anti-lock brake system, and if the front left and front right wheels are braked by the anti-lock brake system, the vehicle body gravity center speed is estimated based upon a smaller one of the wheel speed of the front left and front right wheels detected by the sensor 12 or 14, the yaw rate γ, and the half track Tfl or Tfr of the smaller speed front left or front right wheel according to the same equation as described above.

When the vehicle is a front drive vehicle having an anti-lock brake system, and if the rear left and rear right wheels are braked by the anti-lock brake system, the vehicle body gravity center speed is estimated based upon a smaller one of the wheel speed of the rear left and rear right wheels detected by sensor 16 or 18, the yaw rate γ, and the half track Trl or Trr of the smaller speed rear left or rear right wheel according to the same equation as described above.

When the vehicle is a rear drive vehicle having a traction control system, the vehicle body gravity center speed is estimated based upon the wheel speed of the front left or front right wheel detected by the sensor 12 or 14, the yaw rate γ, and the half track Tfl or Tfr of the corresponding front left or front right wheel according to the same equation as described above.

When the vehicle is a front drive vehicle having a traction control system, the vehicle body gravity center speed is estimated based upon the wheel speed of the rear left or rear right wheel detected by the sensor 16 or 18, the yaw rate γ, and the half track Trl or Trr of the corresponding rear left or rear right wheel according to the same equation as described above.

As will be appreciated by reviewing the control processes according to the flowchart of FIG. 2 with reference to the control calculations conducted by the flowcharts of FIGS. 3 and 4, the half track correction control according to steps 20, 30 and 40 may be omitted if the side shifting of the vehicle body relative to the four wheels according to the lateral biasing of the wheel tires may be disregarded at an allowable sacrifice of the control quality. Therefore, such a modification is another embodiment of the present invention.

Although the present invention has been described in detail with respect to particular embodiments thereof, it will be apparent for those skilled in the art that various modifications are possible with respect to the shown embodiments within the scope of the present invention.

What is claimed is:

1. A device for estimating reference wheel speed of each wheel of a vehicle having a vehicle body, front left, front right, rear left and rear right wheels supporting the vehicle body, and means for detecting operation parameters of the vehicle including wheel speed of each of the front left, front right, rear left and rear right wheels, lateral acceleration, steering angle, and yaw rate, the reference wheel speed estimation device comprising:

means for calculating slip angle of the vehicle body based upon the lateral acceleration, the yaw rate, and vehicle speed detected by said vehicle operation parameter detection means;

means for estimating speed of the vehicle body at a center of gravity of the vehicle body based upon wheel speed detected by said vehicle operation parameter detection means, and the yaw rate; and means for calculating the reference wheel speed of each of the front left, front right, rear left and rear right wheels based upon the vehicle body gravity center speed estimated by said vehicle body gravity center speed estimation means, the steering angle detected by said vehicle operation parameter detection means, the slip angle of the vehicle body calculated by said vehicle body slip angle calculation means, the yaw rate detected by said vehicle operation parameter detection means, a half track of the corresponding wheel, and a half wheel base of the corresponding wheel as follows:

$Vmfl = Vbc*\cos(\delta f-\beta) - \gamma*Tfl*\cos \delta f + \gamma*\sin \delta f*Lf;$ $Vmfr = Vbc*\cos(\delta f-\beta) + \gamma*Tfr*\cos \delta f + \gamma*\sin \delta f*Lf;$ $Vmrl = Vbc*\cos \gamma + \gamma*Trl;$ $Vmrr = Vbc*\cos \beta - \gamma*Trr;$ wherein Vmfl, Vmfr, Vmrl and Vmrr are the reference wheel speed of the front left, front right, rear left and rear right wheels, respectively, Vb is the vehicle body gravity center speed, δf is the steering angle, β is the vehicle body slip angle, γ is the yaw rate, Tfl is a half track of the front left wheel, Tfr is the half track of the front right wheel, Trl is the half track of the rear left wheel, Trr is a half track of the rear right wheel, and Lf is the half wheel base of the front left and front right wheels.

2. The reference wheel speed estimation device according to claim 1, wherein the vehicle is a rear drive vehicle, and said vehicle body gravity center speed estimation means estimates the vehicle body gravity center speed such that when the front left and front right wheels are not braked, the vehicle body gravity center speed is a weighted mean value of a first value and a second value by a weighting factor, said first value being a vehicle body gravity center speed calculated based upon the wheel speed of the front left wheel detected by said vehicle operation parameter detection means, the yaw rate, and the half track of the front left wheel, said second value being a vehicle body gravity center speed calculated based upon the wheel speed of the front right wheel detected by said vehicle operation parameter detection means, the yaw rate, and the half track of the front right wheel, said weighting factor being 0.5 when the lateral acceleration is zero, increasing therefrom along with an increase of the lateral acceleration toward 1.0.

3. The reference wheel speed estimation device according to claim 1, wherein the vehicle is a rear drive vehicle, and said vehicle body gravity center speed estimation means estimates the vehicle body gravity center speed such that, when the front left wheel is braked, while the front right wheel is not braked, the vehicle body gravity center speed is estimated based upon the wheel speed of the front right wheel detected by said vehicle operation parameter detection means, the yaw rate, and the half track of the front right wheel, and when the front right wheel is braked, while the front left wheel is not braked, the vehicle body gravity center speed is estimated based upon the wheel speed of the front left wheel detected by said vehicle operation parameter detection means, the yaw rate, and the half track of the front left wheel.

4. The reference wheel speed estimation device according to claim 1, wherein the vehicle is a front drive vehicle, and said vehicle body gravity center speed estimation means estimates the vehicle body gravity center speed such that when the rear left and rear right wheels are not braked, the vehicle body gravity center speed is a weighted mean value of a first value and a second value by a weighting factor, said first value being a vehicle body gravity center speed calculated based upon the wheel speed of the rear left wheel detected by said vehicle operation parameter detection means, the yaw rate, and the half track of the rear left wheel, said second value being a vehicle body gravity center speed calculated based upon the wheel speed of the rear right wheel detected by said vehicle operation parameter detection means, the yaw rate, and the half track of the rear right wheel, said weighting factor being 0.5 when the lateral acceleration is zero, increasing therefrom along with an increase of the lateral acceleration toward 1.0.

5. The reference wheel speed estimation device according to claim 1, wherein the vehicle is a front drive vehicle, and said vehicle body gravity center speed estimation means estimates the vehicle body gravity center speed such that, when the rear left wheel is braked, while the rear right wheel is not braked, the vehicle body gravity center speed is estimated based upon the wheel speed of the rear right wheel detected by said vehicle operation parameter detection means, the yaw rate, and the half track of the rear right wheel, and when the rear right wheel is braked, while the rear left wheel is not braked, the vehicle body gravity center speed is estimated based upon the wheel speed of the rear left wheel detected by said vehicle operation parameter detection means, the yaw rate, and the half track of the rear left wheel.

6. The reference wheel speed estimation device according to claim 1, wherein the vehicle is a rear drive vehicle having an anti-lock brake system, and said vehicle body gravity center speed estimation means estimates the vehicle body gravity center speed such that, when at least one of the front left and front right wheels is not braked by said anti-lock brake system, the vehicle body gravity center speed is estimated based upon the wheel speed of said not braked one front wheel detected by said vehicle operation parameter detection means, the yaw rate, and the half track of said not braked one front wheel.

7. The reference wheel speed estimation device according to claim 1, wherein the vehicle is a rear drive vehicle having an anti-lock brake system, and said vehicle body gravity center speed estimation means estimates the vehicle body gravity center speed such that, when the front left and front right wheels are braked by said anti-lock brake system, the vehicle body gravity center speed is estimated based upon a smaller one of the wheel speed of the front left and front right wheels detected by said vehicle operation parameter detection means, the yaw rate, and the half track of the smaller speed one front wheel.

8. The reference wheel speed estimation device according to claim 1, wherein the vehicle is a front drive vehicle having an anti-lock brake system, and said vehicle body gravity center speed estimation means estimates the vehicle body gravity center speed such that, when at least one of the rear left and rear right wheels is not braked by said anti-lock brake system, the vehicle body gravity center speed is estimated based upon the wheel speed of said not braked one rear wheel detected by said vehicle operation parameter detection means, the yaw rate, and the half track of said not braked one rear wheel.

9. The reference wheel speed estimation device according to claim 1, wherein the vehicle is a front drive vehicle having an anti-lock brake system, and said vehicle body gravity center speed estimation means estimates the vehicle body gravity center speed such that, when the rear left and rear right wheels are braked by said anti-lock brake system, the vehicle body gravity center speed is estimated based upon a smaller one of the wheel speed of the rear left and rear right wheels detected by said vehicle operation parameter detection means, the yaw rate, and the half track of the smaller speed one rear left wheel.

10. The reference wheel speed estimation device according to claim 1, wherein the vehicle is a rear drive vehicle having an traction control system, and said vehicle body gravity center speed estimation means estimates the vehicle body gravity center speed such that the vehicle body gravity center speed is estimated based upon the wheel speed of one of the front left and front right wheels detected by said vehicle operation parameter detection means, the yaw rate, and the half track of the corresponding one front wheel.

11. The reference wheel speed estimation device according to claim 1, wherein the vehicle is a front drive vehicle having an traction control system, and said vehicle body gravity center speed estimation means estimates the vehicle body gravity center speed such that the vehicle body gravity center speed is estimated based upon the wheel speed of one of the rear left and rear right wheels detected by said vehicle operation parameter detection means, the yaw rate, and the half track of the corresponding one rear wheel.

12. The reference wheel speed estimation device according to claim 1, wherein said vehicle operation parameter detection means is adapted to further detect longitudinal acceleration of the vehicle, the reference wheel speed estimation device further comprising:

means for calculating longitudinal shifting of the vehicle body relative to the front left, front right, rear left and rear right wheels based upon the longitudinal acceleration;

means for calculating lateral shifting of the vehicle body relative to the front left, front right, rear left and rear right wheels based upon the lateral acceleration;

means for calculating ground contact load of each of the front left, front right, rear left and rear right wheels based upon the longitudinal and lateral shifting of the vehicle body;

means for calculating total cornering force of the front left and front right wheels based upon vehicle speed detected by said vehicle operation parameter detection means, change rate of the vehicle body slip angle, and change rate of the yaw rate;

means for calculating total cornering force of the rear left and rear right wheels based upon vehicle speed detected by said vehicle operation parameter detection means, change rate of the vehicle body slip angle, and change rate of the yaw rate;

means for calculating distribution of the front total cornering force between the front left and front right wheels based upon the ground contact load of the front left and front right wheels;

means for calculating distribution of the rear total cornering force between the rear left and rear right wheels based upon the ground contact load of the rear left and front right wheels; and means for estimating lateral biasing of tire of each of the front left, front right, rear left and rear right wheels based upon the cornering force of the corresponding wheel, and compensating for the half track of each of the front left, front right, rear left and rear right wheels by the lateral tire biasing estimated with respect to the corresponding wheel.

* * * * *